United States Patent [19]
Cantor

[11] 3,926,703
[45] Dec. 16, 1975

[54] METAL-RUBBER ADHESION SYSTEM

[75] Inventor: Stephen E. Cantor, Cheshire, Conn.

[73] Assignee: Uniroyal, Inc., New York, N.Y.

[22] Filed: June 11, 1974

[21] Appl. No.: 478,411

Related U.S. Application Data

[62] Division of Ser. No. 319,273, Dec. 29, 1972, Pat. No. 3,862,883.

[52] U.S. Cl. ............ 156/124; 156/110 A; 156/333; 260/3; 260/844; 428/468
[51] Int. Cl.² ... B29H 17/00; C09J 3/12; C08L 7/00
[58] Field of Search .... 156/110 R, 110 A, 110 MD, 156/124, 128 T, 333; 260/844, 845, 3; 117/128.7; 428/468

[56] References Cited
UNITED STATES PATENTS

| | | | |
|---|---|---|---|
| 2,581,920 | /1952 | Kuhn | 156/333 |
| 2,720,479 | /1955 | Crawford et al. | 156/333 |
| 3,507,917 | /1970 | Peterson | 260/543 A |
| 3,517,722 | /1970 | Endter | 156/334 |
| 3,728,192 | /1973 | Kindle et al. | 156/124 |

FOREIGN PATENTS OR APPLICATIONS
1,072,625    1960   Germany

*Primary Examiner*—Douglas J. Drummond
*Assistant Examiner*—John E. Kittle
*Attorney, Agent, or Firm*—Bruce F. Jacobs, Esq.

[57] ABSTRACT

Disclosed is an adhesive system for use in rubber stocks to increase the adhesion of the stock to metal. The invention finds its greatest utility in the production of vulcanized metal-reinforced rubber articles such as hose, pneumatic tires and belts.

The adhesive system of the invention comprises the following two elements:

1. A halogen-donating material such as an N,N-dihalosulfonamide or a cyclic N-haloamide (e.g. a halogenated hydantoin); and 2. A resorcinol type material such as resorcinol itself, m-aminophenol or a partially reacted resorcinol-formaldehyde resin.

11 Claims, No Drawings

METAL-RUBBER ADHESION SYSTEM

This is a division of application Ser. No. 319,273, filed Dec. 29, 1972. now U.S. Pat. No. 3,862,883.

BACKGROUND OF THE INVENTION

In the production of rubber articles such as hose, pneumatic tires or power transmission belts such as V-belts, toothed positive drive belts, etc., it is generally necessary to reinforce the elastomer. In the past, textile materials have been employed for this purose. However, wire cord has been found to be more desirable under certain conditions of use, for example, in pneumatic tires of the radial ply type. Maximum reinforcement of the rubber is obtained when maximum adhesion is produced between the laminate of rubber and the reinforcing element to form a unitary structure. Of equal importance is the requirement that the laminate of the reinforcing element and rubber remain in a bonded relationship with each other throughout the useful life of the reinforced structure in which the laminate is used.

To achieve satisfactory rubber-to-metal bonding, numerous methods have been developed. For example U.S. Pat. No. 2,720,479 describes a system wherein a phenolic resin and a brominated isoolefin-polyolefin interpolymer are dissolved in a suitable liquid carrier and the resulting adhesive composition is spread on rubber which is to be bonded to metal. The rubber and metal are subsequently pressed together and vulcanized. U.S. Pat. No. 2,581,920 also describes the use of halogenated polymers to bond rubber to metal.

In U.S. Pat. No. 3,517,722 to Endter et al. a rubber-metal adhesion system is described which involves formation of a resorcinol-formaldehyde resin at the interface between the rubber and the metal, thereby bonding these members together. In forming the resin, compounds capable of liberating the methylene and resorcinol precursors of the resin are placed in the rubber stock. Upon vulcanization, the methylene and resorcinol are released and presumably react to form the resorcinol-formaldehyde resin.

SUMMARY OF THE INVENTION

In carrying out the present invention, adhesion of rubber elastomers to metal is obtained by incorporating in the rubber stock a halogen donor, as hereinafter defined, and a resorcinol-type compound, viz., resorcinol or other meta-disubstituted benzenes in which each of the substituents is an OH, $NH_2$ or $OCOCH_3$ radical (e.g. m-aminophenol, m-phenylenediamine, resorcinol monoacetate, resorcinol diacetate) or 1,5-naphthalenediol, or a fusible partially reacted resorcinol-formaldehyde resin (condensate of resorcinol and formaldehyde in the ratio of one mole of resorcinol to about 0.5 to 0.8 mole of formaldehyde), or a condensation product of resorcinol and acetone (condensate of resorcinol and acetone in the ratio of one mole of resorcinol to about 0.5 to 2 moles of acetone), or a condensation product of resorcinol and acetaldehyde (condensate of resorcinol and acetaldehyde in the ratio of one mole of resorcinol to about 0.5 to 1 mole of acetaldehyde). Such fusible partially reacted resorcinol-formaldehyde resins may be prepared in known manner by heating a concentrated aqueous solution of resorcinol and formaldehyde, with or without a catalyst such as oxalic acid. The ball and ring softening point (ASTM designation E28-58T) of such fusible partially reacted resins will generally be from about 60°C. to 120°C. Such resorcinol-acetone condensates, which are white powders, may be prepared in known manner by reacting acetone and resorcinol in dilute hydrochloric acid solution at temperatures from 35°C. to 50°C. for several hours. Such resorcinol-acetaldehyde condensates, which are tacky reddish oils, may be prepared in known manner by reacting acetaldehyde and resorcinol in dilute oxalic acid solution at 100°C. for several hours.

The halogen donors useful in the invention have been observed to fall into two classes. The first class comprises N,N-dihalogenated aromatic sulfonamides wherein sulfonamide nitrogen is bonded to two atoms of chlorine, bromine or iodine and the sulfonyl sulfur is bonded directly to the aromatic nucleus. Such sulfonamides have the general formula $Y[SO_2NX_2]_n$ where X is chlorine, bromine or iodine, Y is phenyl, naphthyl, biphenyl or

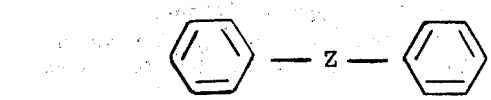

where Z is oxygen, sulfur, or alkylene or alkylidene having from 1 to 3 carbon atoms, and $n$ has a value of 2 or 3. Examples of suitable alkylene or alkylidene groups include methylene, ethylene, propylene, isopropylene, ethylidene, propylidene and isopropylidene. In the foregoing formula, the Y group (phenyl, naphthyl, biphenyl or

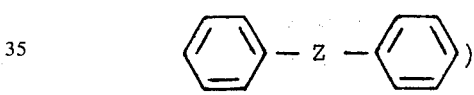

can be unsubstituted or can be substituted with alkyl (especially lower, i.e. $C_1$ to $C_8$ alkyl) or aryl (especially phenyl) moieties.

Representative sulfonamide halogen donors used in the practice of this invention include those having the following structural formulae:

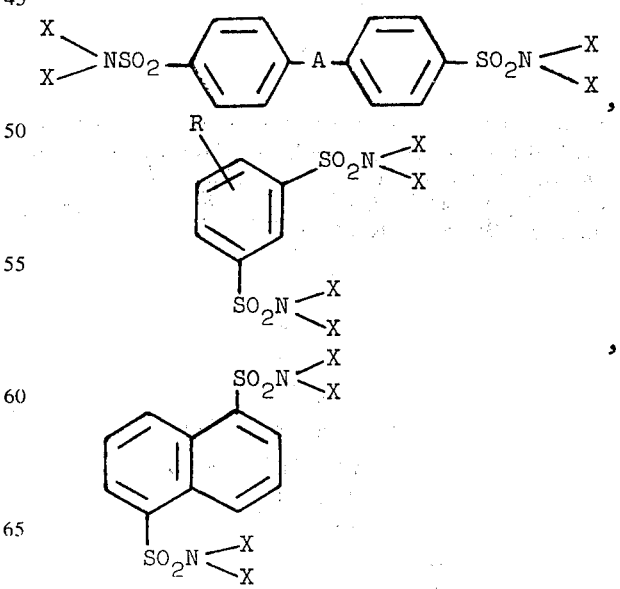

, and

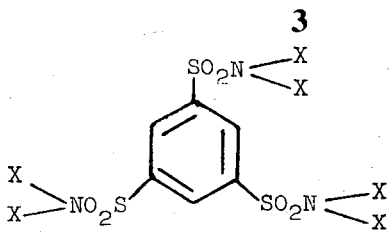

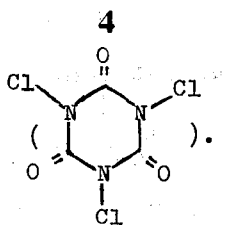

where X is either chlorine, bromine or iodine, A may be zero (i.e. the aryl groups may be linked by a single covalent bond as where the biaryl group is biphenyl), oxygen(oxy), sulfur(thio), $C_1$ to $C_3$ alkylene or alkylidene, and R represents hydrogen, alkyl (especially $C_1$ to $C_8$ lower alkyl) or aryl (especially phenyl) moieties. The sulfonamide halogen donors employed in the present invention are best prepared as described in co-pending U.S. Patent Application Ser. No. 207,647, filed Dec. 13, 1971 by Stephen E. Cantor, now U.S. Pat. No. 3,808,176 by reacting the corresponding unhalogenated aryl sulfonamides with an alkali metal hypohalite.

A second class of halogen donors employed in the invention comprises saturated, heterocyclic amides having a carbonyl carbon situated in the ring, with the carbonyl carbon being bonded to two N-halogenated nitrogen atoms both of which also reside in the heterocyclic ring, i.e. the heterocyclic ring system is characterized by the grouping:

```
  X   O   X
  |   ||  |
 —N — C — N—
``` wherein X is a halogen such as chlorine, bromine or iodine. The cyclic amides may be further exemplified by hydantoins corresponding to the structural formula:

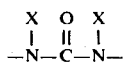

wherein X is chlorine, bromine or iodine and $R_1$ and $R_2$ are hydrogen or alkyl groups having from 1 to 4 carbon atoms, with the total of the carbons in both groups not exceeding 8. Other examples of suitable cyclic amides include: tetrachloroglycoluril

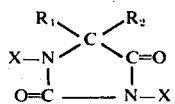

and trichloroisocyanuric acid

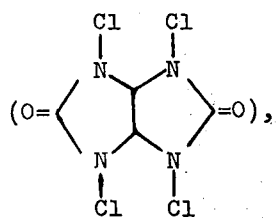

The method of preparation of the cyclic amides is well known. See for example Henze et al. in J.A.C.S., Volume 64, pages 522-23 (1942), wherein hydantoins are formed by reacting the corresponding carbonyl compound with potassium cyanide and ammonium carbonate. In U.S. Pat. 2,920,997, Wolf et al. describe preparation of halogenated hydantoins by reacting a hydantoin precursor with chlorine or bromine. Halogenated isocyanuric acid may be prepared by introducing halogen into a suspension of cyanuric acid as described in German Pat. No. 1,072,625. Similarly, the halogenated glycoluril is prepared by reacting a halogen with the corresponding non-halogenated glycoluril. Other useful methods of synthesizing the cyclic amides are set forth in Beilstein Volume 1. XXVI H 441, E I 131 and E II 260 and in Beilstein Volume II H 598.

In practice of the invention, the halogen donor and resorcinol-type compound are mixed in a Banbury or other suitable mixer with a vulcanizable rubber elastomer and other conventional ingredients such as carbon black, rubber processing or softening oils which may be added as such or may be present from oil-extended rubbers, antioxidants, sulfur, zinc oxide and accelerators. This rubber composition is then coated (as by calendering) onto a metallic reinforcing element (e.g. metallic tire cord material). Subsequently, the reinforced rubber assembly is built into the desired article (e.g. a pneumatic tire) and vulcanized.

The amounts of halogen donor and resorcinol compound employed are not critical. The amount of resorcinol compound employed is generally from 0.5 to 5 parts per 100 parts of dry rubber and preferably is from 1 to 3 parts. The ratio by weight of halogen donor to resorcinol compound will often be from 1 to 2. The total amount of the donor and resorcinol compound mixed with the rubber will often be from 0.1 to 10 parts per hundred of the rubber hydrocarbon.

Rubber elastomers employed in the invention are any of the highly unsaturated elastomers (by which is meant rubbery polymers of aliphatic conjugated diolefins and copolymers of such diolefins and one or more other unsaturated monomers, which copolymers contain copolymerized therein at least 25% by weight of aliphatic cconjugated diolefin) typified by natural rubber (NR), butadiene-styrene rubber copolymers (SBR), butadiene-acrylonitrile rubbery copolymers (NBR), so-called synthetic natural rubber, i.e. synthetic polyisoprene high in cis-1,4 configuration (IR), rubbery polybutadienes (BR), etc.

The following examples illustrate the invention. The wire tire cord used in the examples was of a 5×7–0.0058 inches over twisted 3×1×1 construction commonly employed in making the plies of a pneumatic tire. The surface of each strand of steel wire was coated with brass (an alloy of 70% copper and 30% zinc ± 5%) at the rate of 5.5 grams of brass per kilogram of steel ± 1.5 grams.

The unaged or "green" adhesion of the rubber compounds was measured at 72°F. after the cable was coated with the rubber compound being tested and the assembly vulcanized at 320°F. for 30 minutes. The pounds necessary to pull the adhered cable free from the rubber is the adhesion value in pounds. The aged adhesion of the compounds was determined at 250°F. after the rubber-cable assembly has been vulcanized at 320°F. for 30 minutes. The adhesion tests were conducted following ASTM test number D-2229-68. Unless otherwise indicated, all parts and percentages referred to herein are by weight.

EXAMPLE 1

This example illustrates the high adhesion levels (both aged and unaged) obtained by the present invention. These should be contrasted to the adhesion levels obtained with the control, a stock not containing the additives of the invention.

A rubber compound was prepared by mixing 30 parts of natural rubber, 25 parts of cis-polybutadiene rubber, 67.5 parts of styrene-butadiene rubber, 60 parts of carbon black, 5 parts of zinc oxide, 1.5 parts of stearic acid, 10 parts of naphthenic oil and 1 part of an antioxidant, namely a reaction product of diphenylamine and diisobutylene (Octamine — Trademark of Uniroyal, Inc.) To this masterbatch was added 0.5 parts of N-t-butyl-2benzothiazole sulfenamide, (Delac NS — Trademark of Uniroyal, Inc.), 0.5 parts of tetramethyl-thiuram disulfide (Tuex — Trademark of Uniroyal, Inc.) and 1 part of sulphur.

In runs A through F, a condensation product of 1.0 part of resorcinol with 1.0 part of acetaldehyde was added as the resorcinol compound. The amount of this condensation product used was 2 parts per 100 parts of rubber. Additionally, 1 part of each of various halogen donors per 100 parts of rubber were incorporated as indicated in Table I.

A control rubber compound was prepared in a manner similar to that described above except that the resorcinol-type compound and halogen donor were omitted. This was used in Control 1.

Adhesion results obtained are shown in Table I.

TABLE I

| Run | Halogen Donor | Unaged Adhesion | | Aged Adhesion | |
|---|---|---|---|---|---|
| | | Pull, lbs./in. | Wire Covered, % | Pull, lbs./in. | Wire Covered, % |
| A | Tetrachloro-glycoluril | 123 | 25 | 115 | 75 |
| B | 1,3-Dichloro-5,5-dimethyl hydantoin | 111 | 25 | 126 | 75 |
| C | 1,3-Dibromo-5,5-dimethyl hydantoin | 112 | 50 | 115 | 50 |
| D | N,N-Dichlorobenzene Sulfonamide | 118 | 50 | 124 | 75 |
| E | Trichloro-isocyanuric Acid | 145 | 90 | 159 | 95 |
| F | N,N-Dichloro-p-toluene Sulfonamide | 159 | 90 | 136 | 75 |
| Control 1 | (None) | 85 | 25 | 63 | 0 |

From Table I, it can be seen that the stock of Control 1 showed an unaged adhesion of 85 pounds per inch with stock adhering to 25% of the wire after the wire had been withdrawn from the sample. This indicates that in the green or unaged state, the wire to rubber bond was relatively weak. After aging (as described above) the adhesion was reduced to approximately 63 pounds per inch. However, the amount of stock adhering to the wire had fallen to almost nothing. This indicates that the green adhesion was further weakened by aging.

By comparison, it will be noted from Table I that green adhesion in runs A through F always exceeded 110 pounds per inch as opposed to 85 pounds for the control. Indeed trichloroisocyanuric acid and N,N-dichloro-p-toluene sulfonamide exhibited green adhesions of approximately 145 and 159 pounds respectively which are more than 1.7 times the green adhesion exhibited by the control.

Upon aging, the adhesion in runs A through F remained relatively constant, i.e. it increased somewhat in runs B, C, D and E and decreased slightly in runs A and F. This constrasts markedly with Control 1 where, upon aging, a marked decrease in adhesion was noted. Even in runs A and C, which exhibited the lowest aged adhesion (approximately 115 pounds), the aged adhesion was almost twice the aged adhesion of Control 1 (63 pounds).

It should also be noted that even after aging, runs A through F showed good coverage of the wire with stock after the wire had been withdrawn. This should be contrasted with almost no stock remaining in Control 1 after aging further illustrates that aging does not significantly harm adhesion obtained by the present invention.

EXAMPLE 2

This example is presented to illustrate the improved adhesion of the invention (run G) as contrasted with Control 2 which employed a halogen donor but did not employ the resorcinol-donating component of the invention.

The ingredients employed, and aging and testing of the stocks were as described in Example 1. In both run G and in Control 2, the halogen donating material was the benzene sulfonamide (1 phr) corresponding to the structural formula:

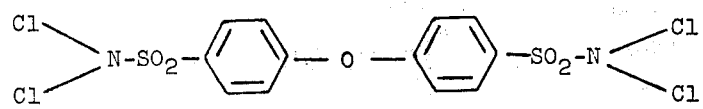

In run G, the resorcinol donor was the same material as was used in Example 1 (2 phr).

The adhesion levels (both green and aged) for run G and Control 2 are set forth in Table II.

TABLE II

|  | G | Control 2 |
|---|---|---|
| N,N,N',N'-Tetrachloro-oxybis (benzene-sulfonamide) | 1 phr | 1 phr |
| Resorcinol Donor of Example 1 | 2 phr | none |
| Unaged Adhesion | | |
| pull, lbs./in. | 160 | 118 |
| wire covered, % | 100 | 50 |
| Aged Adhesion | | |
| pull, lbs./in. | 155 | 110 |
| wire covered, % | 95 | 50 |

From Table II it will be seen that the green adhesion achieved in run G was approximately 30% better than the green adhesion level of Control 2 (160 pounds vs. 118 pounds). Also in run G, the very high portion of rubber covering the wire in the green example demonstrates that a very strong metal-rubber bond was obtained. Upon aging, the adhesion levels in both run G and in Control 2 remained relatively constant with the adhesion in run G remaining superior to Control 2.

While the mechanism of the present invention is not fully understood, one can speculate that the halogen donor provides labile halogen in the free radical form which may attack the metal surface of the wire and thereby contribute to adhesion as seen in Control 2. However, this does not explain the increase in adhesion levels obtained when the resorcinol-donating component of the invention was employed in combination with the halogen donor. To illustrate the efficacy of the halogen donor alone, it will be noted that the adhesion levels of Control 2 compare favorably with runs A through D (which exemplify the invention) and which are set forth in Table I. However, even the fairly good adhesion levels obtained in Control 2 are markedly improved when the halogen donor of Control 2 is employed in combination with a resorcinol donor as illustrated in run G typifying the invention.

EXAMPLE 3

This example is presented to illustrate the effect on adhesion of the resorcinol donor alone. The run is denoted as Control 3. This should be contrasted with Control 1, where neither the resorcinol nor halogen donor was employed, and also with Control 2 where only a halogen donor was employed.

In Control 3, the type of ingredients, aging and testing of the stocks resembled Example 1. The resorcinol donor employed was the same compound as was used in Example 1 (2 phr).

For the green stock of Control 3, the pull required to extract the wire from the stock was about 87 pounds per inch with the extracted wire being 80% covered with rubber. Upon aging as described in Example 1, the adhesion level was about 79 pounds per inch while the wire coverage was about 80%.

By comparison of Control 3 with Control 1, it can be seen that the poor adhesion level in Control 1, as measured in pounds of pull required to extract the wire, was not appreciably improved by incorporation of the resorcinol donor alone in the stock. The adhesion levels of Control 3 were also markedly inferior to those of the invention; see runs A through D.

In Control 3, the green wire coverage was about 80% which compares favorably with runs A through F exemplifying the invention. However, this relatively high wire coverage could easily be due to weakness in the stock rather than a superior rubbermetal bond. Upon aging, the wire pull test revealed that the adhesion level in Control 3 was very little improved over Control 1, i.e. use of the resorcinol donor did not appreciably increase the adhesion.

From Control 3, it can be seen that use of a resorcinol donor alone results in little, if any, improvement in metal-rubber adhesion. From Control 2, (Example 2) it can be seen that use of a halogen donor alone may result in improving adhesion. Surprisingly, it has been discovered that when the relatively inactive resorcinol donor is employed in combination with a halogen donor, the resulting rubber-to-metal adhesion is far superior to that obtained by use of either the resorcinol compound or the halogen donor alone.

In the interest of technical completeness, TABLE III sets forth the data on the physical properties of which were measured for both the uncured stocks and the vulcanizates made in accordance with all of the runs of Example 1, Run G of Example 2 and Control 3 of Example 3. It will be seen that all of the stocks reported in TABLE III had nearly identical uncured properties and were cured to essentially the same physical properties; while the incorporation of the N-halo compounds tended to show the rate of cure and to produce vulcanizates with lower tensile strength, the values obtained for physical properties are more than sufficient to fabricate finished articles.

TABLE III

Physical Properties of Stocks Containing Various N-Halo Compounds

|  | Control 1 | A | B | C | D | E | F | G | Control 3 |
|---|---|---|---|---|---|---|---|---|---|
| Stock | 202 | 202 | 202 | 202 | 202 | 202 | 202 | 202 | 202 |
| Resorcinol Compound |  | 2 | 2 | 2 | 2 | 2 | 2 | 2 | 2 |
| Tetrachloroglycoluril |  | 1 |  |  |  |  |  |  |  |
| 1,3-Dichloro-5,5-dimethyl hydantoin |  |  | 1 |  |  |  |  |  |  |
| 1,3-Dibromo-5,5-dimethyl hydantoin |  |  |  | 1 |  |  |  |  |  |
| N,N-Dichlorobenzene Sulfonamide |  |  |  |  | 1 |  |  |  |  |
| Trichloroisocyanuric Acid |  |  |  |  |  | 1 |  |  |  |
| N,N-Dichloro-p-toluene Sulfonamide |  |  |  |  |  |  | 1 |  |  |
| N,N,N',N'-Tetrachloro-oxybis-(benzene sulfonamide) |  |  |  |  |  |  |  | 1 |  |
| ML-4 at 212°F. | 46 | 42 | 46 | 46 | 47 | 45 | 48 | 46 | 46 |
| Cure Rate | 3 | 6 | 5 | 3 | 7 | 4 | 7 | 11 | 4 |
| Mooney Scorch at 270°F. | 15 | 20 | 20 | 17 | 17 | 21 | 22 | 27 | 23 |

TABLE III-continued

Physical Properties of Stocks Containing Various N-Halo Compounds

| | Control 1 | A | B | C | D | E | F | G | Control 3 |
|---|---|---|---|---|---|---|---|---|---|
| Cured at 320°F. for 30 min. | | | | | | | | | |
| S-300 | 1760 | 1330 | 1500 | 1570 | 1360 | 1550 | 1590 | 1400 | 1820 |
| Tensile | 3250 | 2600 | 2680 | 2640 | 2340 | 2820 | 2180 | 3010 | 2400 |
| Elongation | 520 | 510 | 480 | 470 | 460 | 460 | 400 | 510 | 380 |

While the invention is of particular value for enhancing the adhesion of rubber to brass-coated or bronze-coated steel wire, and while the foregoing specific examples exemplify the invention as applied to brass-coated steel wire, it will be understood by those skilled in the art that the invention can be used for enhancing the adhesion of rubber to reinforcing elements having metal surfaces broadly. Thus, it is applicable, for example, with glass fiber coated with metals and alloys of metals including lead, zinc, tin, copper, aluminum, silver, etc. In other words, it can be used to promote the adhesion of rubber to any metal to which rubber can be made to adhere when vulcanized in contact therewith.

I claim:

1. In the method of adhering a metallic reinforcing element having a surface of brass to rubber by applying a vulcanizable rubber composition to the element and heating the assembly to vulcanize the rubber, the steps comprising:

Incorporating in the rubber composition before vulcanization a halogen donor selected from the group consisting of 1) N,N-dihalogenated aromatic sulfonamides wherein the sulfonamide nitrogen is bonded to two atoms of chlorine, bromine or iodine and the sulfonyl sulfur is bonded directly to the aromatic nucleus and 2) cyclic N-halogenated amides wherein a carbonyl carbon in the ring is bonded to two nitrogen atoms, each of said nitrogen atoms in turn being bonded to a halogen atom thereby forming the grouping

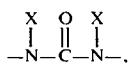

wherein X is chlorine, bromine or iodine and,

B. Incorporating in the rubber composition a member selected from the group consisting of resorcinol, m-aminophenol, m-phenylene diamine, resorcinol monoacetate, resorcinol diacetate, 1,5-naphthalenediol, partially reacted resorcinol-formaldehyde resins, condensation products of resorcinol and acetone, and condensation products of resorcinol and acetaldehyde.

2. A method as in claim 1 wherein the halogen donor is an N,N-dihalogenated aromatic sulfonamide as defined in Claim 1 and having the general formula $Y(SO_2NX_2)_n$ where X is chlorine, bromine or iodine, Y is phenyl, naphthyl, biphenyl or

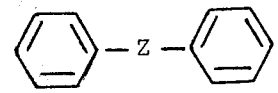

where Z is oxygen, sulfur, or alkylene or alkylidene having from 1 to 3 carbon atoms, and $n$ has a value of 2 or 3.

3. A method as in claim 2 wherein the members of the Y group are substituted with a lower alkyl having from 1 to 8 carbon atoms or with a phenyl group.

4. A method as in claim 1 wherein the halogen donor is N,N-dichlorobenzene sulfonamide.

5. A method as in claim 1 wherein the halogen donor is N,N,N',N'-tetrachloro-oxy-bis (benzene sulfonamide).

6. A method as in claim 1 wherein the halogen donor is N,N-dichloro-p-toluene sulfonamide.

7. A method as in claim 1 wherein the halogen donor is a hydantoin having the general formula:

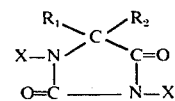

wherein X is chlorine, bromine or iodine and $R_1$ and $R_2$ are hydrogen or an alkyl group having from 1 to 4 carbon atoms.

8. A method as in claim 1 wherein the halogen donor is 1,3-dichloro-5,5-dimethylhydantoin.

9. A method as in claim 1 wherein the halogen donor is 1,3-dibromo-5,5-dimethylhydantoin.

10. A method as in claim 1 wherein the halogen donor is tetrachloroglycoluril.

11. A method as in claim 1 wherein the halogen donor is trichloroisocyanuric acid.

* * * * *